United States Patent
Hars

(10) Patent No.: US 7,047,262 B2
(45) Date of Patent: May 16, 2006

(54) ENTROPY ESTIMATION AND DECIMATION FOR IMPROVING THE RANDOMNESS OF TRUE RANDOM NUMBER GENERATION

(75) Inventor: Laszlo Hars, Cortlandt Manor, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 673 days.

(21) Appl. No.: 10/224,992

(22) Filed: Aug. 21, 2002

(65) Prior Publication Data

US 2004/0039762 A1 Feb. 26, 2004

(51) Int. Cl.
*G06F 1/02* (2006.01)

(52) U.S. Cl. ...................................... 708/255
(58) Field of Classification Search ................ 708/255, 708/250
See application file for complete search history.

(56) References Cited

U.S. PATENT DOCUMENTS

| | | | |
|---|---|---|---|
| 4,571,556 A | 2/1986 | Gnerlich et al. | |
| 5,153,532 A | 10/1992 | Albers et al. | |
| 5,570,307 A | 10/1996 | Takahashi | |
| 5,596,617 A | 1/1997 | Wolf et al. | |
| 5,606,322 A | 2/1997 | Allen et al. | |
| 5,781,458 A * | 7/1998 | Gilley | 708/255 |
| 5,942,902 A | 8/1999 | Okayasu | |
| 5,963,104 A | 10/1999 | Buer | |
| 6,046,616 A | 4/2000 | Chan et al. | |
| 6,253,223 B1 | 6/2001 | Sprunk | |
| 6,324,558 B1 | 11/2001 | Wilber | |
| 6,687,721 B1 * | 2/2004 | Wells et al. | 708/250 |
| 6,771,104 B1 | 8/2004 | Hars | |
| 6,862,605 B1 * | 3/2005 | Wilber | 708/255 |
| 2001/0005155 A1 | 6/2001 | Smeets | |
| 2004/0103131 A1 * | 5/2004 | Henry et al. | 708/250 |
| 2005/0055391 A1 * | 3/2005 | Carlson et al. | 708/250 |

FOREIGN PATENT DOCUMENTS

| | | |
|---|---|---|
| EP | 0 981 081 A2 | 2/2000 |
| EP | 1 075 084 A2 | 8/2000 |
| WO | WO 99/38069 | 7/1999 |
| WO | WO 01/61854 A1 | 8/2001 |

\* cited by examiner

*Primary Examiner*—D. H. Malzahn
(74) *Attorney, Agent, or Firm*—Edward W. Goodman

(57) ABSTRACT

A random number generating system operates to generate an output number bit sequence based on an entropy estimation of a true random number bit sequence, the randomness of the output number bit being an improvement of the randomness of the true random number bit sequence. A physical random number generator communicates the true random number bit sequence to an entropy estimator, which generates an estimation signal indicative of the randomness of the true random number bit sequence. The estimation signal is communicated to a decimator whereby, in accordance with estimation signal, the decimator generates the output number bit as a representation of a decimation of a mixing of the true random number bit sequence and the pseudo random number bit sequence, or as a representation of a decimation of the pseudo random number bit sequence when the pseudo random number bit sequence is generated as a function of the true random number bit sequence.

15 Claims, 4 Drawing Sheets

ENTROPY ESTIMATION AND DECIMATION FOR IMPROVING THE RANDOMNESS OF TRUE RANDOM NUMBER GENERATION

BACKGROUND OF THE INVENTION

1. Field of the Invention

The present invention generally relates to physical random number generators (i.e., a device that generates a bit or bits representative of a number by operating one or more components of the device in an undeterminable manner) and pseudo random number generators (i.e., a device that inputs a random number bit or bits to generate pseudo random number bit sequence(s) based upon an algorithm). The present invention specifically relates to an employment of one or more physical random number generators and one or more pseudo random number generators in yielding an unbiased sequence of random number bits.

2. Description of the Related Art

Physical random number generators, as known in the art, generate a random number bit or bits by operating one or more components of the device in an undeterminable manner. Conceptually, the undeterminable operation of the component(s) yields an unbiased random generation of the random number bit(s). In practice, the undeterminable operation of the component(s) typically yields a biased random generation of the random number bit(s) due to various tolerances related to the operation of the component (s). Pseudo random number generators, as known in the art, are employed to rectify the biased random generation of the random number bit(s) to an acceptable degree.

SUMMARY OF THE INVENTION

The present invention additionally employs an entropy estimator and a decimator to further improve upon the randomness of a true random number bit sequence. Various aspects of the present invention are novel, non-obvious, and provide various advantages. While the actual nature of the present invention covered herein can only be determined with reference to the claims appended hereto, certain features, which are characteristic of the embodiments disclosed herein, are described briefly as follows.

The present invention is a random number generation system comprising a physical random number generator, a pseudo random number generator, an entropy estimator, and a decimator. The physical random number generator operates to generate one or more true random number bit sequences. The pseudo random number generator operates to generate one or more pseudo random number bit sequences. The entropy estimator operates to generate one or more estimation signals as an indication of a randomness of the true random number bit sequence(s). In one form, the decimator operates to generate one or more output number bit sequences representative of a decimation of a mixing of the one or more true random number bit sequences and the one or more pseudo number bits in accordance with the one or more estimation signal(s). In a second form, the pseudo random number bit sequence(s) are generated as a function of the true random number bit sequence(s) and the output number bit sequences(s) are a representation of a decimation of the pseudo random number bit sequence(s) in accordance with the estimation signal(s).

The foregoing forms, as well as other forms, features and advantages of the present invention, will become further apparent from the following detailed description of the presently preferred embodiments, read in conjunction with the accompanying drawings. The detailed description and drawings are merely illustrative of the present invention rather than limiting, the scope of the present invention being defined by the appended claims and equivalents thereof.

DETAILED DESCRIPTION OF THE PREFERRED EMBODIMENTS

Figure 1:
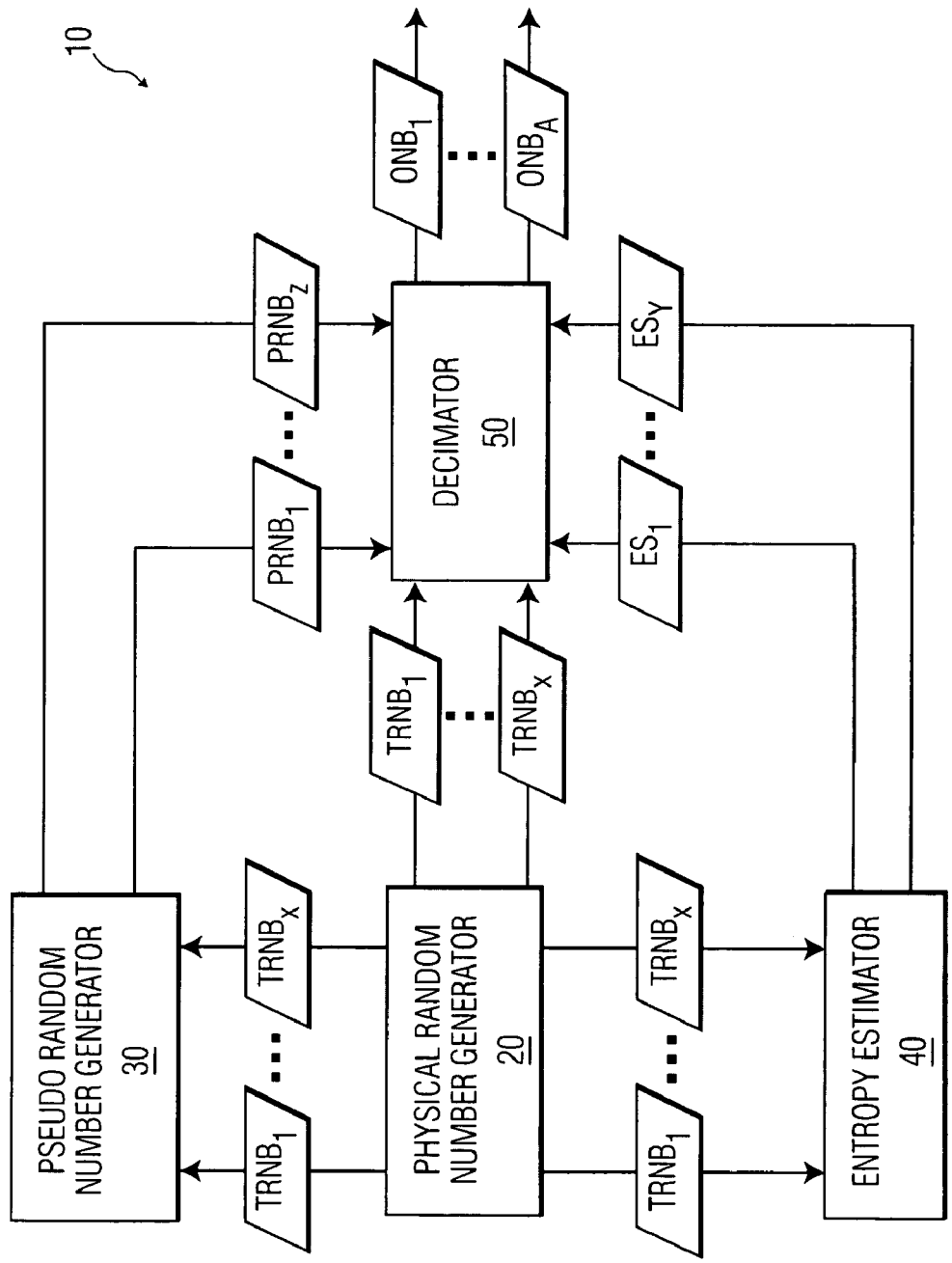
FIG. 1 illustrates a block diagram of a basic embodiment of a random number generation system in accordance with the present invention.

FIG. 1 illustrates a random number generation system 10 (hereinafter "system 10") comprising a physical random number generator 20 (hereinafter "PHNG 20"), a pseudo random number generator 30 (hereinafter "PSNG 30"), an entropy estimator 40, and a decimator 50. The PHNG 20 is in communication with the entropy estimator 40 to thereby provide one or more true random number bit sequences $TRNB_1$–$TRNB_X$ to the entropy estimator 40. The PHNG 20 can also be in communication with the decimator 50 to thereby provide the true random number bit sequences $TRNB_1$–$TRNB_X$ to the decimator 50. The entropy estimator 40 is in communication with the decimator 50 to thereby provide one or more estimation signals $ES_1$–$ES_Y$ to the decimator 50. The PSNG 30 is in communication with the decimator 50 to thereby provide one or more pseudo random number bit sequences $PRNB_1$–$PRNB_Z$ to the decimator 50. The PSNG 30 can be in communication with the PHNG 20 as illustrated whereby one or more of the pseudo random number bit sequences $PRNB_1$–$PRNB_Z$ are generated as a function of one or more of the true random number bit sequences $TRNB_1$–$TRNB_X$. In accordance with the estimation signal(s) $ES_1$–$ES_Y$, the decimator 50 generates one or more output number bit sequences $ONB_1$–$ONB_A$ representative of a decimation of a mixing of the true random number bit sequence(s) $TRNB_1$–$TRNB_X$ and the pseudo random number bit sequence(s) $PRNB_1$–$PRNB_Z$ or representative of a decimation of the pseudo random number bit sequence(s) $PRNB_1$–$PRNB_Z$.

Figure 2:
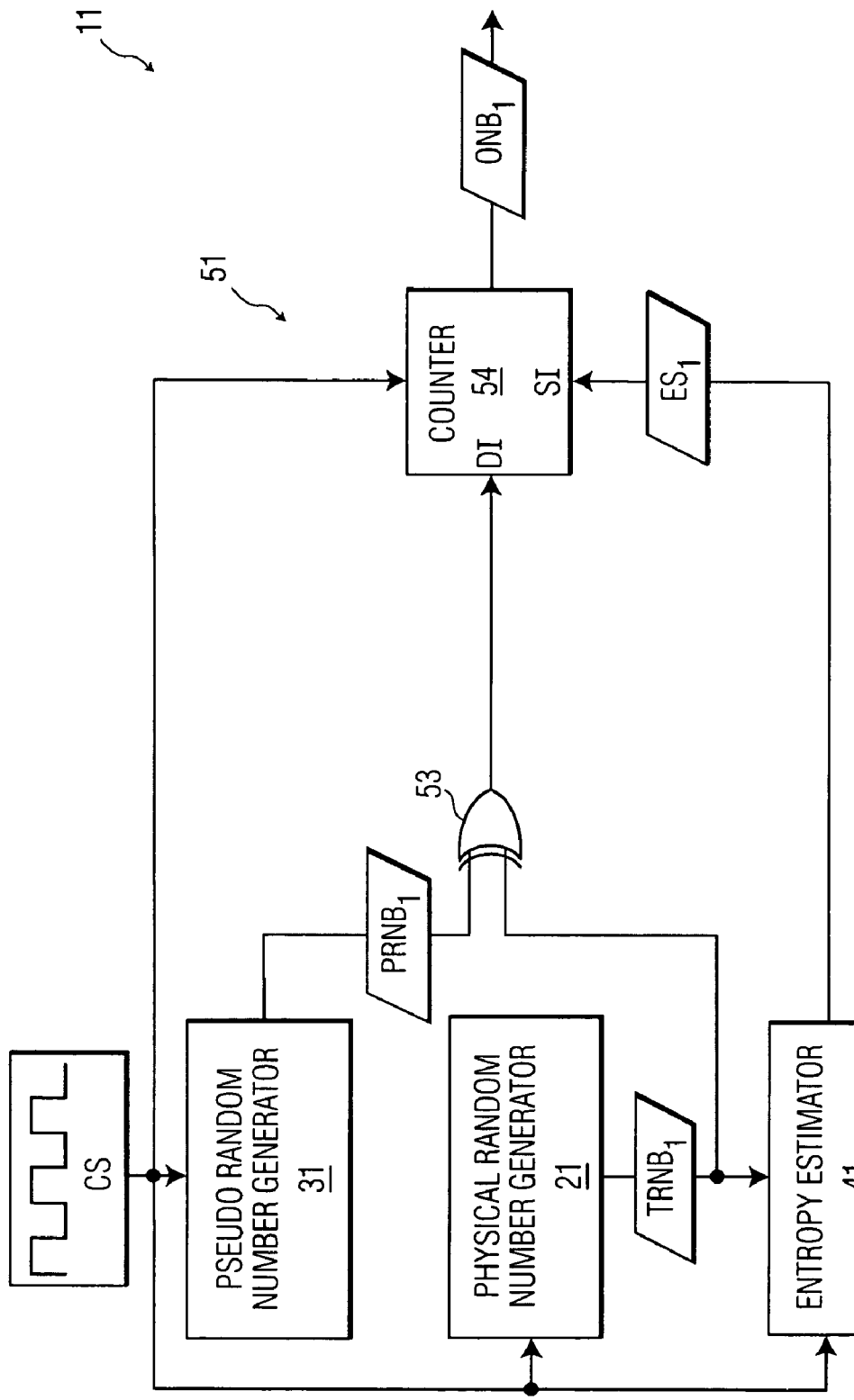
FIG. 2 illustrates a block diagram of a first embodiment of the FIG. 1 random number generation system in accordance with the present invention.
Figure 3:
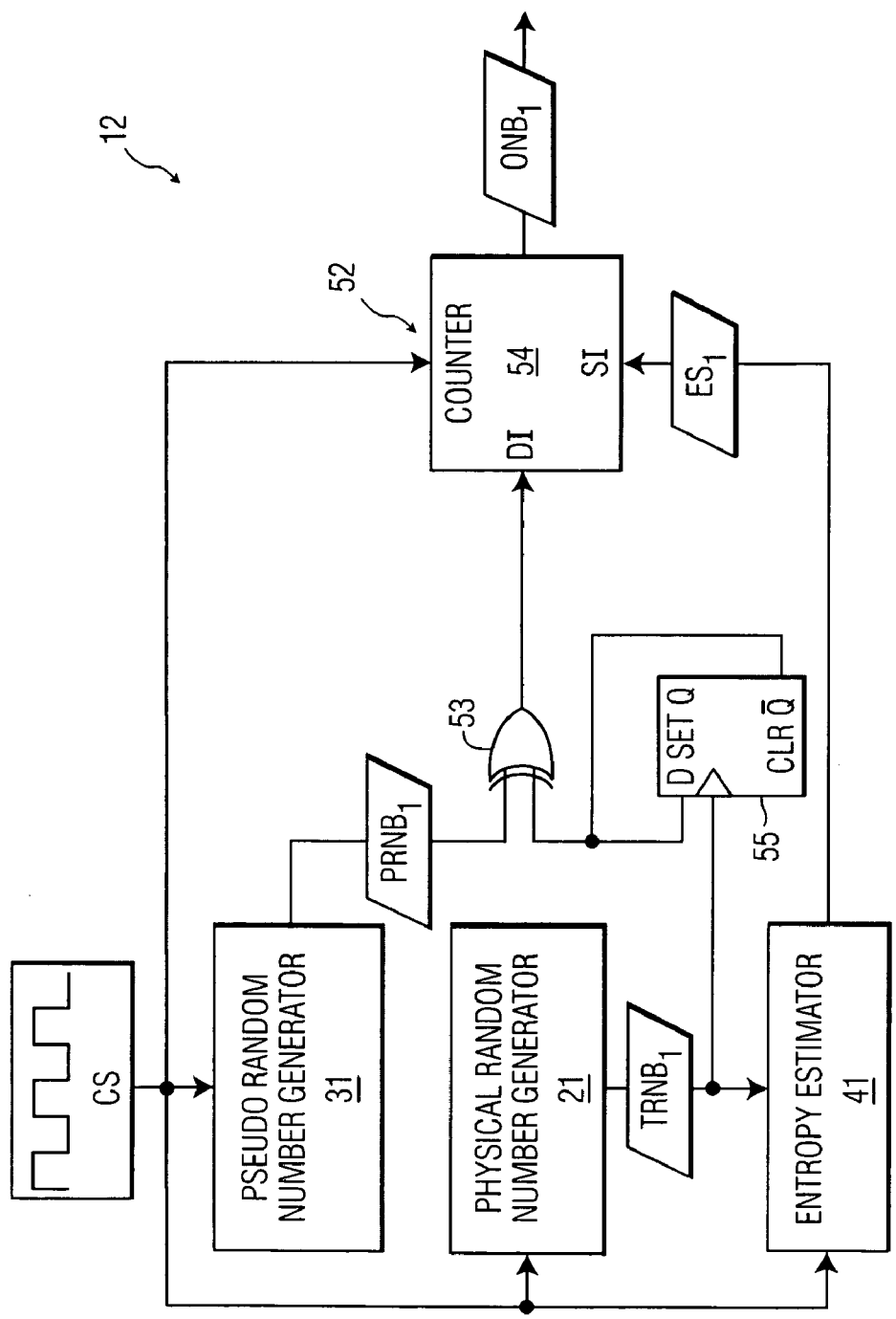
FIG. 3 illustrates a block diagram of a second embodiment of the FIG. 1 random number generation system in accordance with the present invention.
Figure 4:
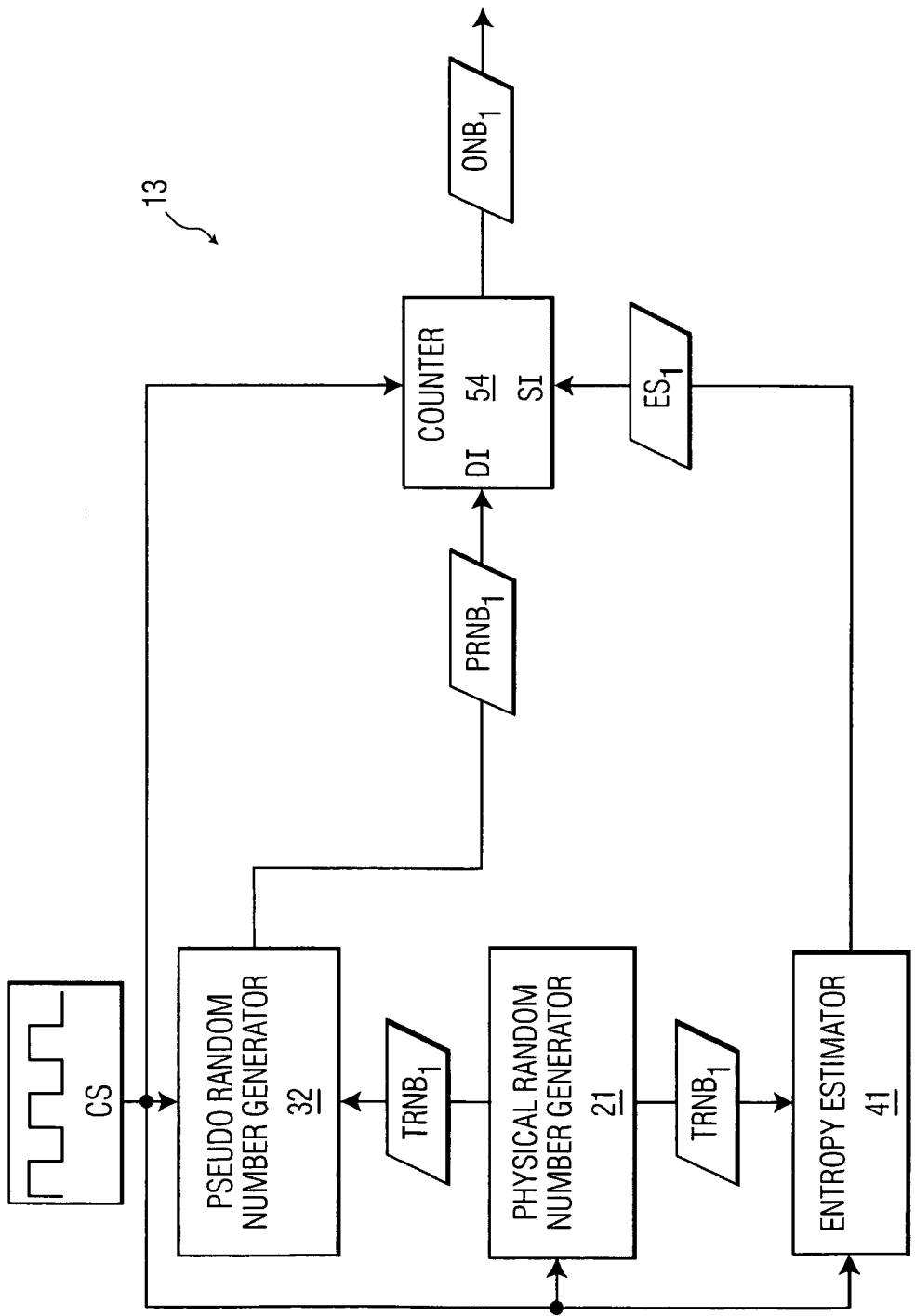
FIG. 4 illustrates a block diagram of a third embodiment of the FIG. 1 random number generation system in accordance with the present invention.

The number of configurations of the PHNG 20, the PSNG 30, the entropy estimator 40, and the decimator 50 is without limit. Additionally, the aforementioned communications among the PHNG 20, the PSNG 30, the entropy estimator 40, and the decimator 50 can be achieved in numerous ways (e.g., electrically, optically, acoustically, and/or magnetically). The number of embodiments of the system 10 is therefore essentially limitless. FIGS. 2–4 illustrate exemplary embodiments of the system 10.

FIG. 2 illustrates a random number generation system 11 (hereinafter "system 11") as one embodiment of system 10 (FIG. 1). The system 11 includes a physical random number generator 21 (hereinafter "PHNG 21") for generating a true random number bit sequence $TRNB_1$ (X=1), and a pseudo random number generator 31 (hereinafter "PSNG 31") for generating a pseudo random number bit sequence $PRNB_1$ (Z=1). The PHNG 21 and the PSNG 31 may be embodied in software, hardware, or a combination of software and hardware. In one embodiment of the PHNG 21, the PHNG 21 is configured in accordance with a U.S. patent application Ser. No. 10/205,231, filed Jul. 25, 2002, entitled "Latching Electronic Circuit For Random Number Generation", the entirety of which is hereby incorporated by reference and commonly owned by the Assignee. In a second embodiment of the PHNG 21, the PHNG 21 is configured in accordance with a U.S. patent application Ser. No. 10/205,273, filed Jul. 25, 2002, entitled "Switching Electronic Circuit For Random Number Generation", now U.S. Pat. No. 6,771,104, the entirety of which is hereby incorporated by reference and commonly owned by the Assignee. In one embodiment of the PHNG 21, the PHNG 21 is configured in accordance with U.S. patent application Ser. No. 10/236,178, filed Sep. 6, 2002, entitled "Feedback Random Number Generation Method And System", the entirety of which is hereby incorporated by reference and commonly owned by the Assignee.

As shown in FIG. 1, the true random number bit sequence $TRNB_1$ can be communicated to the PSNG 30 by the PHNG 20 whereby the pseudo random number bit sequences $PRNB_1$–$PRNB_Z$ are a function of the true random number bit sequences $TRNB_1$–$TRNB_X$.

As shown in FIG. 2, the system 11 further includes an entropy estimator 41 for generating an estimation signal $ES_1$ (Y=1) as a function of the true random number bit sequence $TRNB_1$. The entropy estimator 41 can be embodied in software, hardware, or a combination of software and hardware. In one embodiment, the entropy estimator 41 employs a conventional method of measuring a largest randomness error in the generation of the true random number bit sequence $TRNB_1$ as would occur to one having skill in the art. The accuracy of the estimation signal $ES_1$ can be enhanced with a running averaging or an exponential averaging of the measurements. When security is a high priority, the entropy estimator 41 can further employ one or more conventional randomness test algorithms and/or one or more conventional attack detectors.

The system 11 further includes a decimator 51 having a logic component in the form of an XOR gate 53 that receives the true random number bit sequence $TRNB_1$ and the pseudo random number bit $PRNB_1$. Alternatively, other logic components, consisting of one or more logic circuits, can be utilized in lieu of XOR gate 53. The decimator 51 further includes a counter 54. The output of the XOR gate is communicated to a data input DI of the counter 54, and the estimation signal $ES_1$ is communicated to a selection input SI of the counter 54. In accordance with the estimation signal $ES_1$, the counter 54 generates an output number bit sequence $ONB_1$ (A=1) as a representation of a decimation of a mixing of the true random number bit sequence $TRNB_1$ and the pseudo random number bit sequence $PRNB_1$.

Preferably, the PHNG 21, the PSNG 31, the entropy estimator 41, and the counter 54 are synchronously operated by a clock signal CS as illustrated in FIG. 2. Alternatively, one or more of the PHNG 21, the PSNG 31, the entropy estimator 41, and the counter 54 can be synchronously operated in a different manner and/or asynchronously operated.

FIG. 3 illustrates a random number generation system 12 (hereinafter "system 12") as one embodiment of system 10 (FIG. 1). The system 12 includes the PHNG 21, the PSNG 31, and the entropy estimator 41 as previously described herein in connection with FIG. 2. To enhance the mixing of the true random number bit sequence $TRNB_1$ and the pseudo random number bit sequence $PRNB_1$, the system 12 further includes a decimator 52, including the XOR gate 53, the counter 54, and a bi-stable latch in the form of a D-type flip-flop 55. The flip-flop 55 has a clock input receiving the true random number bit sequence $TRNB_1$ and an inverted output $\overline{Q}$ providing a latched random number bit LRNB to a data input D of the flip-flop 55 and an input of the XOR gate 53. Alternatively, other types of bi-stable latches may be utilized in lieu of the flip-flop 55.

FIG. 4 illustrates a random number generation system 13 (hereinafter "system 13") as one embodiment of system 10 (FIG. 1). The system 13 includes the PHNG 21, the entropy estimator 41, and the counter 54 as previously described herein in connection with FIG. 2. For system 13, a PSNG 32 generates the pseudo random number bit sequence $PRNB_1$ as a function of the true random number bit sequence $TRNB_1$ and communicates the pseudo random number bit sequence $PRNB_1$ to the data input DI of the counter 54. In response thereto, the counter 54 generates the output number bit sequence $ONB_1$ (A=1) as a representation of a decimation of the pseudo random number bit sequence $PRNB_1$ in accordance with the estimation signal $ES_1$.

While the embodiments of the present invention disclosed herein are presently considered to be preferred, various changes and modifications can be made without departing from the spirit and scope of the present invention. The scope of the present invention is indicated in the appended claims, and all changes that come within the meaning and range of equivalents are intended to be embraced therein.

What is claimed is:

1. A random number generating system comprising:
   a physical random number generator for generating one or more true random number bit sequences;
   a pseudo random number generator for generating one or more pseudo random number bit sequences;
   an entropy estimator coupled to said physical random number generator for generating one or more estimation signals indicative of a randomness of the one or more true random number bit sequences; and
   a decimator coupled to said physical random number generator and said pseudo random number generator for mixing the one or more true random number bit sequences and the one or more pseudo random number bit sequences, and coupled to said entropy estimator for generating one or more output number bit sequences representative of a decimation of the mixing of the one or more true random number bit sequences and the one or more pseudo random number bit sequences in accordance with the one or more estimation signals.

2. The random number generating system as claimed in claim 1, wherein said pseudo random number generator is coupled to said physical random number generator for generating the one or more pseudo random number bit sequences as a function of the one or more true random number bit sequences.

3. A random number generating system comprising:
   a physical random number generator for generating one or more true random number bit sequences;
   a pseudo random number generator for generating one or more pseudo random number bit sequences;
   an entropy estimator coupled to said physical random number generator for generating one or more estimation signals indicative of a randomness of the one or more true random number bit sequences; and
   a decimator coupled to said pseudo random number generator for generating one or more output number bit sequences as a representation of a decimation of the one or more of the pseudo random number bit sequences in accordance with the one or more estimation signals from said entropy estimator.

4. The random number generating system as claimed in claim 3, wherein said pseudo random number generator is coupled to the physical random number generator for generating the one or more pseudo random number bit sequences as a function of the one or more true random number bit sequences.

5. A random number generating system comprising:
a physical random number generator operable to generate a true random number bit sequence;
a pseudo random number generator operable to generate a pseudo random number bit sequence;
an entropy estimator operable to generate an estimation signal indicative of a randomness of the true random number bit sequence; and
a decimator coupled to said physical random number generator and said pseudo random number generator for mixing the true random number bit sequence and the pseudo random number bit sequence, and to said entropy estimator for generating an output number bit sequence as a representation of a decimation of the mixing of the true random number bit sequence and the pseudo random number bit sequence in accordance with the estimation signal.

6. The random number generating system as claimed in claim 5, wherein said decimator comprises:
a logic component for receiving the true random number bit sequence and the pseudo random number bit sequence.

7. The random number generating system as claimed in claim 6, wherein said decimator further comprises:
a counter having an input coupled to an output of said logic component.

8. The random number generating system as claimed in claim 6, wherein said decimator further comprises:
a counter coupled to receive the estimation signal and an output of said logic component.

9. The random number generating system as claimed in claim 5, wherein said decimator comprises:
a bi-stable latch for receiving the true random number bit sequence, and a logic component for receiving the pseudo random number bit sequence and an output of said bi-stable latch.

10. The random number generating system as claimed in claim 9, wherein said decimator further comprises:
a counter coupled to an output of said logic component.

11. The random number generating system as claimed in claim 9, wherein said decimator comprises:
a counter coupled to receive the estimation signal and an output of said logic component.

12. The random number generating system as claimed in claim 5, wherein said pseudo random number generator is coupled to said physical random number generator for generating the pseudo random number bit sequence as a function of the true random number bit sequence.

13. A random number generating system comprising:
a physical random number generator for generating a true random number bit sequence;
a pseudo random number generator for generating a pseudo random number bit sequence;
an entropy estimator coupled to said physical random number generator for generating an estimation signal indicative of a randomness of the true random number bit sequence; and
a decimator coupled to said pseudo random number generator for generating an output number bit sequence as a representation of a decimation of the pseudo random number bit sequence in accordance with the estimation signal from said entropy estimator.

14. The random number generating system as claimed in claim 13, wherein said decimator comprises:
a counter coupled to receive the pseudo random number bit sequence and the estimation signal.

15. The random number generating system as claimed in claim 13, wherein said pseudo random number is coupled to said physical random number generator for generating the pseudo random number bit sequence as a function of the true random number bit sequence.

* * * * *